United States Patent [19]

Letwin

[11] Patent Number: 5,257,370
[45] Date of Patent: Oct. 26, 1993

[54] METHOD AND SYSTEM FOR OPTIMIZING DATA CACHING IN A DISK-BASED COMPUTER SYSTEM

[75] Inventor: James G. Letwin, Kirkland, Wash.

[73] Assignee: Microsoft Corporation, Redmond, Wash.

[21] Appl. No.: 401,315

[22] Filed: Aug. 29, 1989

[51] Int. Cl.[5] ............................................. G06F 13/00
[52] U.S. Cl. ............................. 395/650; 364/DIG. 1; 364/243.4; 364/243.41
[58] Field of Search ... 364/200 MS File, 900 MS File; 395/650

[56] References Cited

U.S. PATENT DOCUMENTS

| | | | |
|---|---|---|---|
| 4,489,378 | 12/1984 | Dixon et al. | 364/200 |
| 4,533,995 | 8/1985 | Christian et al. | 364/200 |
| 4,536,836 | 8/1985 | Dodd et al. | 364/200 |
| 4,882,642 | 11/1989 | Taylor et al. | 360/78.11 |

*Primary Examiner*—Gareth Shaw
*Assistant Examiner*—Abdollah Katbab
*Attorney, Agent, or Firm*—Seed and Berry

[57] ABSTRACT

A method for dynamic caching of data in a disk based operating system. Upon the opening of a file, an access log is created. The access log is updated while accessing the data from the file. Range of access and access time are determined from the access log, and based on the range of access and access time, it is determined whether access of the file was sequential and within a predetermined access time. Based on this determination, a predetermined amount of data from the file is stored in a cache memory when access was sequential and also within the predetermined access time.

11 Claims, 7 Drawing Sheets

METHOD AND SYSTEM FOR OPTIMIZING DATA CACHING IN A DISK-BASED COMPUTER SYSTEM

FIELD OF THE INVENTION

This invention relates to the field of disk based computer systems and more specifically to a method and means for optimizing data transfer from non-volatile memory into random-access memory.

BACKGROUND OF THE INVENTION

Computer systems typically employ some type of non-volatile data storage device such as a floppy disk or hard disk for the long term storage of programs as well as data. While these devices are essential components in a computer system, data transfer between the respective storage devices and the computer system is relatively slow. Therefore, while executing, the computer system reads selected portions of the data stored on a disk into random access memory where it may be accessed more rapidly. However, the random access memory of most computer systems is not large enough to store all the data contained on the disk device, and accordingly, data is retreived from the disk in pieces, as required by a particular program.

One technique used to speed the accessing of data stored on a disk is to pre-read and cache data so it will be available in random access memory before it is requested by a program. This is sometimes referred to as "read ahead". In the past, data caching was performed in one of two ways. According to a first technique, a fixed amount of data is read ahead and cached every time a disk is accessed. For example, if an application requests a specific amount of data, the requested data as well as a fixed additional amount of data (i.e. 512 bytes) is read into memory. Therefore, the next time an application requires data from disk, it may already be resident in memory and a time consuming disk access may be avoided. While this technique does improve the speed of a computer system, it is inefficient in many cases. For example, many times an application will only require small amounts of data from a disk (i.e. 64 bytes). If the computer system is continuously reading ahead by 512 bytes, system performance is degregaded by the additional time required for seeking and reading data which is not needed by the system. In another case, if an application is requesting large amounts of data (i.e. 1024 bytes), and the system is reading ahead by 512 bytes, the system is still required to perform additional disk accesses since the data is not available in random access memory.

Another technique used for reading ahead data is to monitor the behavior of a computer system to determine the character of the disk accesses. For example, does the application consistently request relatively large amounts of data or relatively small amounts of data. Once this determination is made, the size of the cache may be adjusted accordingly. This technique is also inefficient in many cases. For example, when a computer system is first turned on, there is no past behavior record and therfore, there is some delay before a past behavior record can be established. Furthermore, the more delay incurred, the more accurate the past behavior log will be. Accordingly, this technique requires a user to trade lost opportunities for caching data for the accuracy of the behavior record. Still another problem with this technique is that it is impossible for the system to adjust to rapid changes in usage behavior. This also results in inefficient usage of the memory system.

The present invention overcomes the above problems by providing a method and means for determining past-access behavior by the time a file is opened, thus eliminating the delay typically required to create a past behavior log. Heuristics may then be applied instantaneously when establishing the size of the data cache.

SUMMARY AND OBJECTS OF THE INVENTION

In summary, the present invention provides an improved method and means for caching data in a disk based computer system. In operation, upon opening a file, an access log is created. The present invention monitors file access behavior for the file and records the access behavior in the file access log while determining whether the file access behavior was sequential or sequential and fast. Once file access behavior is determined, the present invention caches relatively large amounts of data if the access behavior was sequential and fast and caches relatively small amounts of data if the access behavior was sequential. The access behavior is recorded in an area associated with the file upon closing the file.

Once the access log has been created, the access log is read upon opening a file, and caching is performed based on the access behavior read upon opening the file.

Accordingly, it is an object of the present invention to provide a method and means for determining the past behavior of a file immediately upon opening the file.

It is another object of the present invention to provide a method and means for applying heuristics to data caching to improve the speed and performance of a computer system.

It is yet another object of the present invention to provide a method and means for automatically adjusting the size of a data cache based on the behavior of a file.

BRIEF DESCRIPTION OF THE DRAWINGS

These and other objects will be apparent from the detailed description below and the accompanying drawings in which.

DETAILED DESCRIPTION OF THE INVENTION

The present invention is adapted to monitor disk usage and to automatically modify cache size based on current usage. In addition, whenever a file is closed, the present invention stores access information such as a value in the volume which indicates usage level or access behavior. Whenever the file is re-opened, the usage value or flag is read and cache size is established based on the usage record. Therefore, cache size is established immediately upon opening a file, thus eliminating lost opportunity to cache optimally.

Figure 1A:
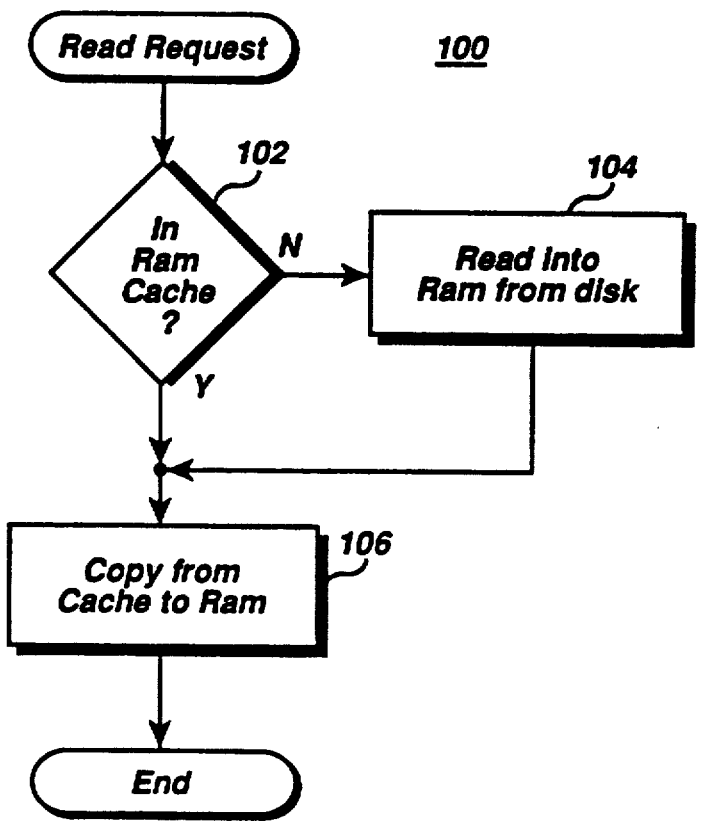
FIG. 1A is a flow diagram of the process used in conventional caching systems.

FIG. 1A is a diagram of a typical caching operation. The process 100 is invoked whenever a read request is received by the memory control system or file system driver from an operating system kernel. Decision 102 determines whether the requested data is stored in RAM cache. If not, item 104 copies the requested data from a disk drive into RAM. If data is present in cache, item 106 reads this data directly from the cache into RAM. Since disk based read operations require mechanical steps such as moving a disk head, the operation represented by item 104 is quite time consuming compared to reading data directly from a cache buffer.

Figure 1B:
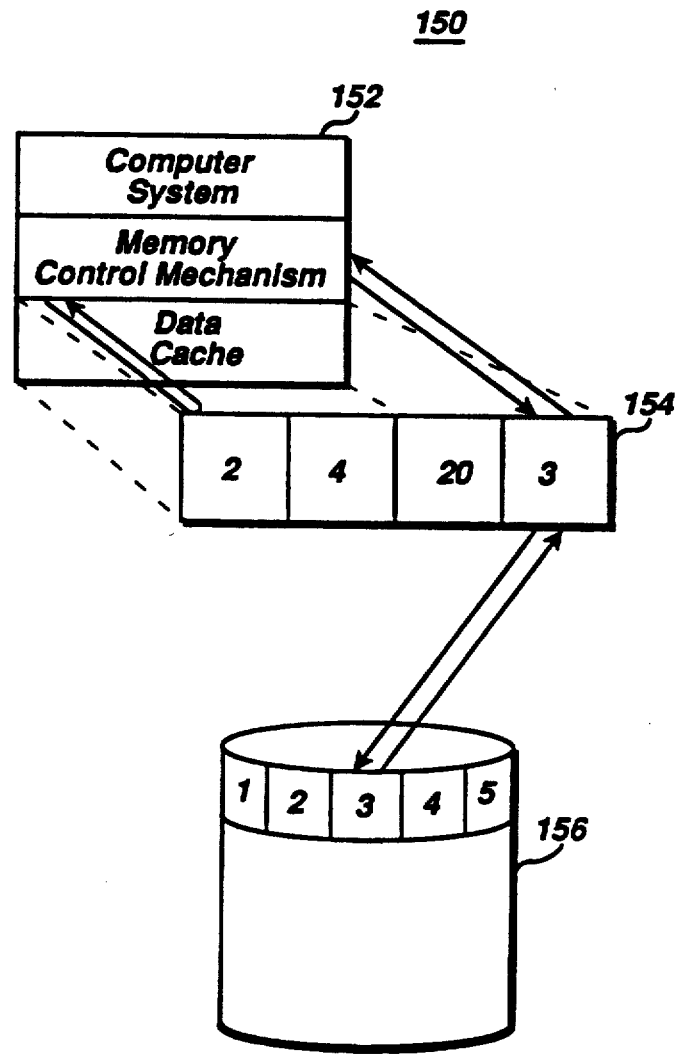
FIG. 1B is another diagram of a conventional data caching technique.

This process may be further understood by referring to FIG. 1B. In the system 150, the computer system 152 generates requests for reading sectors of data resident on disk drive 156. The system 150 first determines whether the data is present in cache 154. If, for example, sector 2 is present in cache, it is immediately returned to computer system 152. In contrast, if the requested sector is not present in cache, a request for data is routed through a memory controller (not shown) to fetch the requested data from disk 156 as represented by sector 3. This data is then placed in cache where it is subsequently routed to computer system 152. Thus, not only is the process delayed by the mechanical operation of the disk drive 156, non-cached operations require two steps as opposed to the single step required by cached operations. Accordingly, it is highly desirable to perform cached operations whenever possible.

Two tasks are associated with the operation of the present invention: establishing and maintaining a behavior log or profile and employing heuristics to modify the size of the data cache dynamically.

Figure 2A:
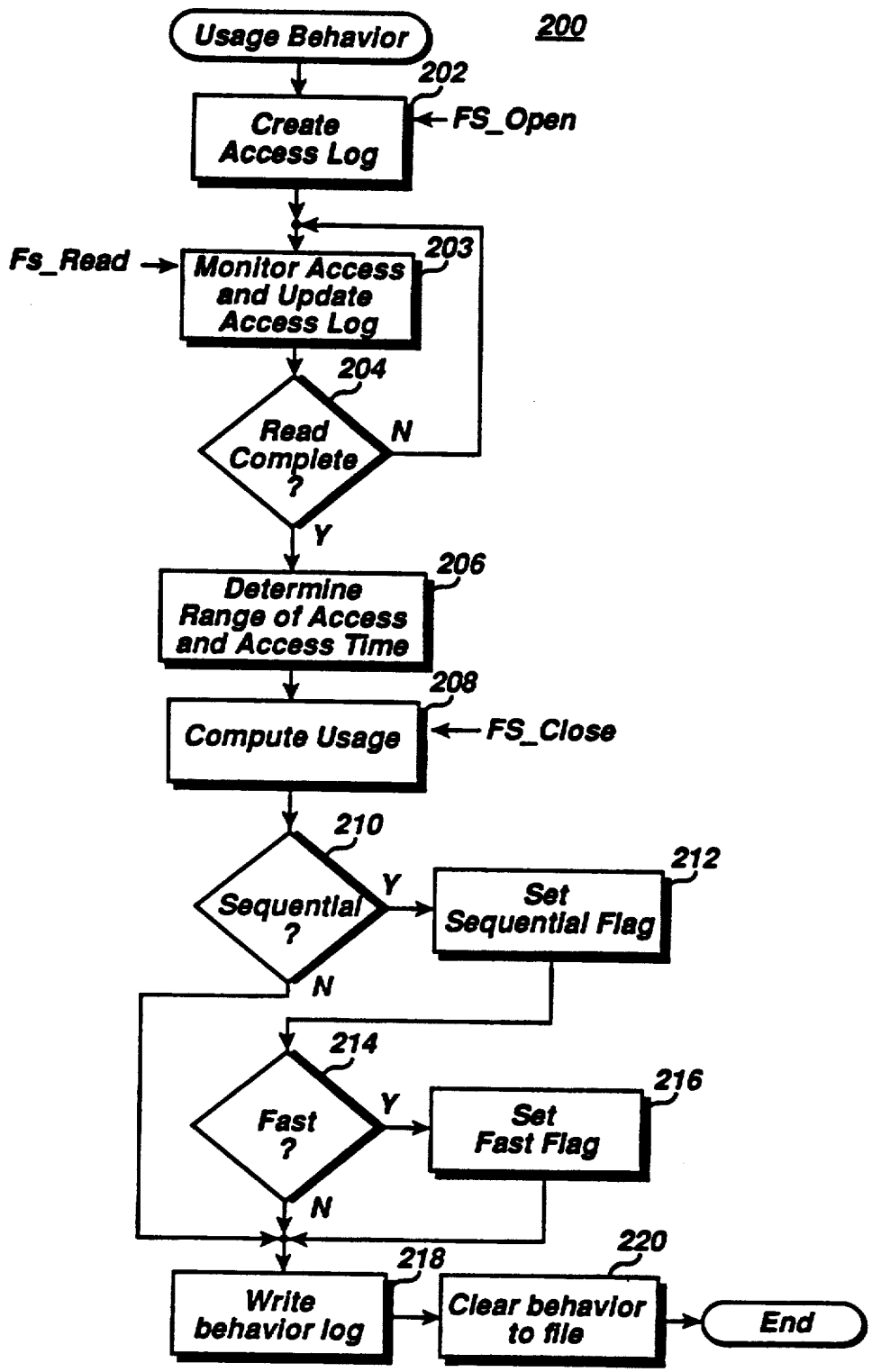
FIG. 2A is a diagram of the process of determining usage behavior in accordance with the teachings of the present invention.

Referring now to FIG. 2A, the process 200 is used for updating and maintaining a behavior log. The process 200 begins upon the memory control mechanism receiving an open command from the computer system. An access log is then opened by item 202. When a read request is received, the range of data read and the access time is monitored. Each access is recorded until the read operation is completed as detected by decision 204. Item 208 is invoked when a close file command is received to read the access log and compute whether the access was sequential, sequential and fast or random. The concept of random, fast and sequential or sequential reads is discussed further below. If random, no action is performed by the present invention. Decision 210 determines whether the access was sequential. If so, item 212 sets a flag indicating sequential operation. Then, decision 214 determines whether the access was sequential and fast. If so, item 216 sets a flag to indicate sequential and fast operation. If access was not determined fast, or not determined sequential, control passes to item 218 without setting any flags. Once any respective flags have been set, item 218 records the behavior log and control passes to item 220 to clear the behavior. The behavior log is preferably stored with the file which was accessed or in a data structure use to locate the file on disk.

Figure 2B:
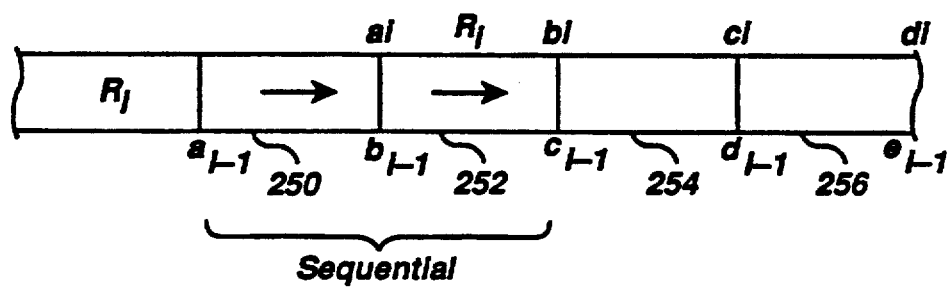
FIG. 2B is a diagram of a sequential disk read operation.

The method of determining whether sequential or sequential and fast access was recorded may be explained as follows. Disks are typically organized in a series of contiguous sectors. However, sequential data on a disk may not always be stored in contiguous sectors for reasons which are readily apparent to persons of ordinary skill. The contiguous layout of sectors on a disk is represented in FIG. 2B. For example, sector 250 is adjacent to sector 252; sector 252 is adjacent to sector 254; sector 254 is adjacent to sector 256, etc. If sectors 250, 252, 254, and 256 are read in series, i.e. adjacent sectors read one after the other, the disk access is considered sequential. If however, the disk access pattern was to read sector 250 followed by sector 256, the access pattern is considered non-sequential or random. A fast sequential access is one which occurs when large number of sectors are read rapidly, such as when an application program is loaded. A regular sequential access occurs during the normal operation of an application program when reading or writting relatively small amounts of data. When monitoring the access history of a file, the disk access may record information in the form:

$R_1(t,a,b)$ $R_2(t,a,b)$ $R_3(t,a,b)$ $R_n(t,a,b)$ wherein t is a measure of time and a and b refer to the extent of travel in the file as shown in FIG. 2B.

According to the principles of the present invention, a sequential read may be considered a read of substantially adjacent sectors which are either adjacent or proximately located within a locality factor, defined as follows:

$R_i(a_i, b_i)$: preceded by $R_{i-1}(a_{i-1}, b_{i-1})$ where:
$a_i = \text{Succ}(b_{i-1})$; and
$\text{Succ}(a) = a + \Delta$
$0 < \Delta < \delta$
$\delta = $ locality factor determined by unit size of disk I/O.

Given the above relationships, a sequential operation is identified when the total number of substantially adjacent sectors read divided by total number of sectors read exceeds a predetermined amount $R_s$, defined by according to the following relationship:

$$\left( \sum_{i=1}^{n} \text{Sequential Reads} \right) / \text{Total Reads} > R_s$$

Where $R_s = 0.80$

To determine whether a sequential read is fast, assume:

$t_1 = $ the time a first read occurs;
$t_n = $ the time the last read occurs; and
$T_R = t_n - t_1$ A read is considered fast if a total number of sectors read divided by a total amount of time lapsed exceeds a predetermined amount TR, as defined by:

$$\frac{b_n - a_1}{t_n - t_1} > TR$$

Figure 3:
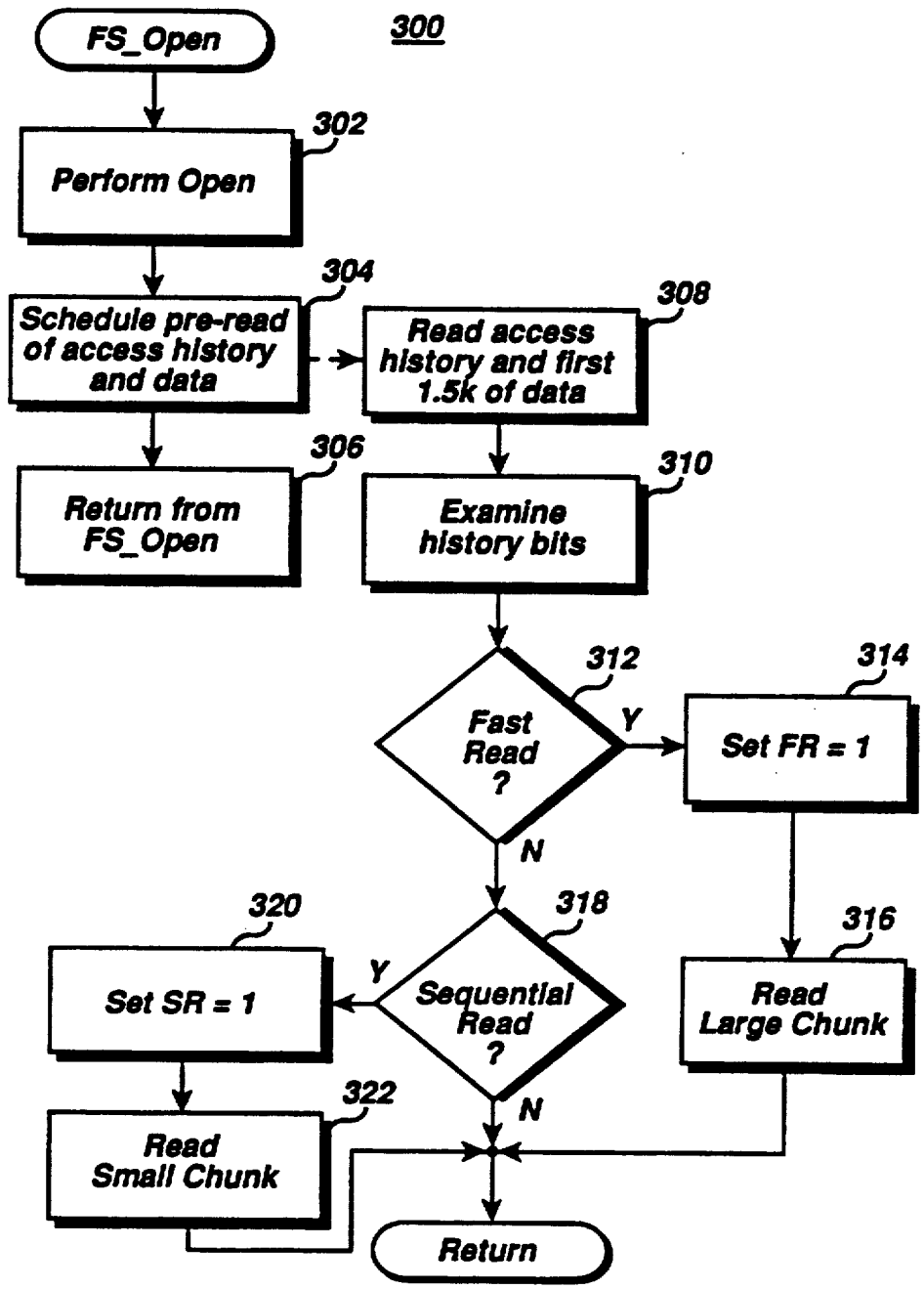
FIG. 3 is a diagram of the operation of the present invention upon receipt of an FS_open command.
Figure 4:
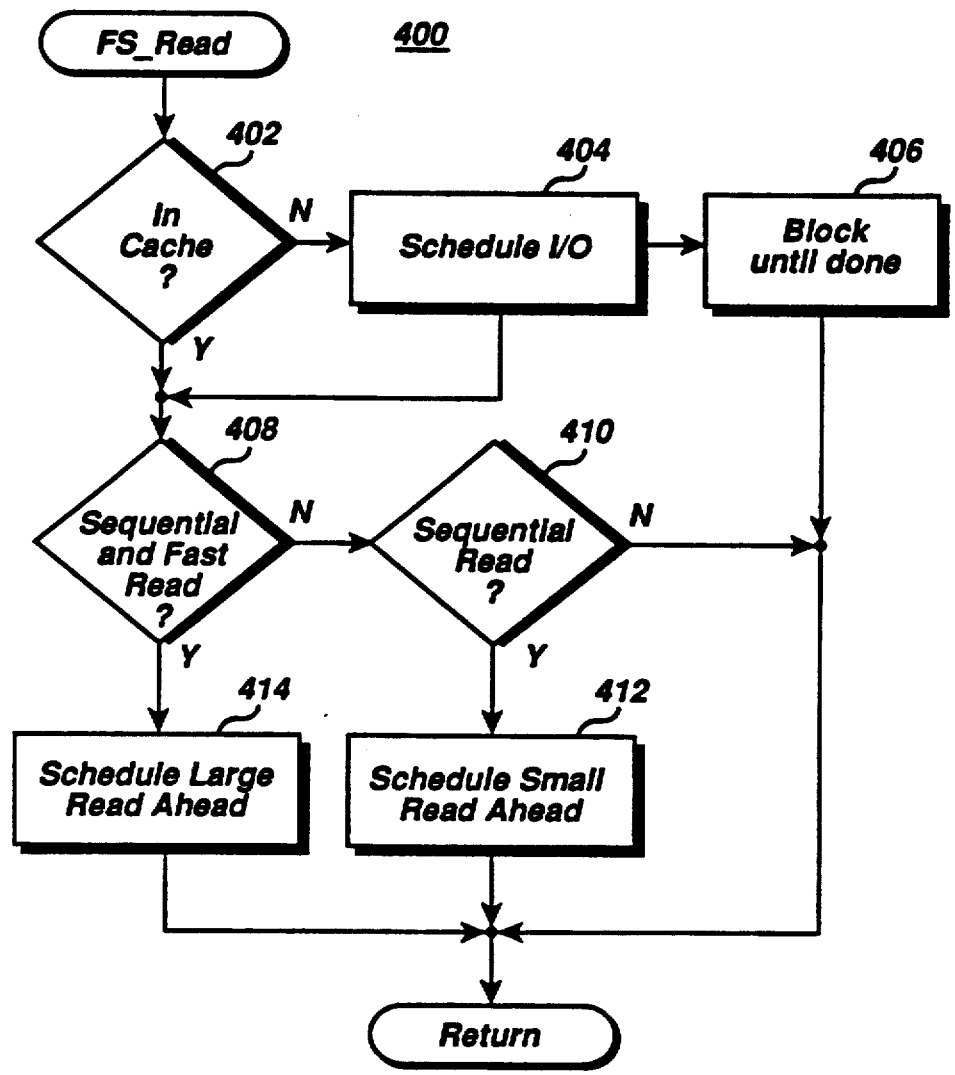
FIG. 4 is a diagram of the operation of the present invention upon receipt of an FS_read operation.
Figure 5:
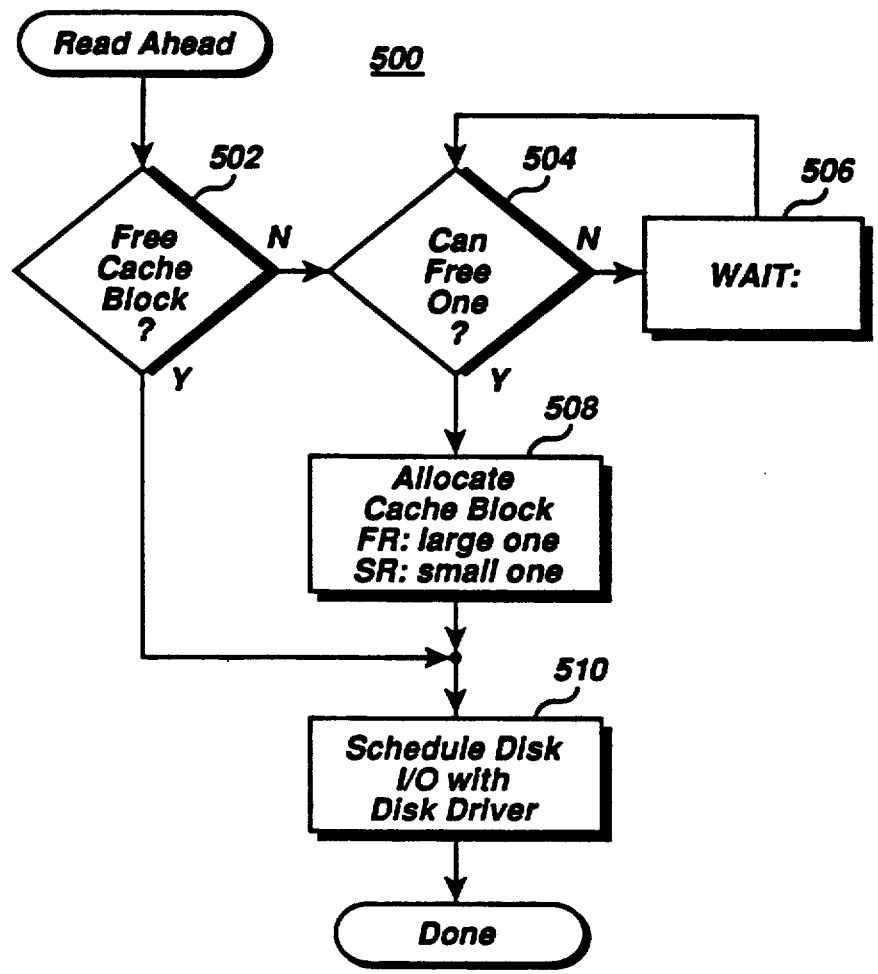
FIG. 5 is a diagram of the cache function performed in the context of the present invention.

Once the present invention has determined whether a read operation is sequential or sequential and fast, this information is used to apply heuristics to the caching process as described in conjunction with FIGS. 3-5. Referring now to FIG. 3, the process 300 is invoked when an FS_Open (file open) command is received from the computer system. Item 302 performs the open operation. Control then passes to item 304 which schedules a preread to cache data of the disk data based on the access history and at the same time creates a new process to instruct a new process to read the indicated data. The original process returns in item 306. The new process created by item 304 begins with item 308 which reads the access history from the disk along with the first 1.5K of data in the portion of interest in the file which is read. Item 310 then examines the access history. Decision 312 determines whether a fast read is indicated. If so, item 314 sets the fast read flag. Control then passes to item 316 which reads a large amount of data (for example, 1024 bytes) into the cache and the routine returns. If decision 312 determines a fast read is not indicated, control passes to decision 318 which determines whether a sequential read is indicated. In not, the routine returns. If a sequential read is indicated, item 320 sets the sequential read flag and item 322 reads a relatively small amount of data (for example, 1024 bytes) into cache. The routine then returns.

Referring now to FIG. 4, when an FS_Read (file system read) command is received, the routine 400 is invoked. Decision 402 determines whether the requested data is in cache. If not, item 404 schedules the I/O and item 406 blocks further operation until the read operation is complete. If the requested data is in cache or when item 404 is complete, decision 408 determines whether the access history indicates a fast and sequential read. If so, control passes to item 414 to schedule a large read ahead and the routine returns. If the access history did not indicate a fast and sequential read, decision 410 determines whether the access history indicates a sequential read. If not, the routine returns. If so, item 412 schedules a small read ahead and the routine returns.

Referring now to FIG. 5, the routine 500 is invoked to read ahead data. When invoked, decision 502 determines whether a free cache block is available. If so, item 510 is invoked to schedule I/O with the disk driver and control returns. Otherwise, decision 504 determines whether a cache block can be freed. If not, control passes to item 506 to wait until a cache block can be freed. Once a cache block can be freed, control returns to decision When a cache block can be freed, control passes from decision 504 to item 508 to allocate a cache block wherein a large block is allocated for fast sequential read operations and a small block is allocated for small read operations. Once the cache block is allocated, control passes to item 510 to schedule disk I/O with the disk driver. The routine then returns.

In summary, an improved method and means for caching data has been described. In operation, the present invention determines access behavior and records the access behavior in an area associated with the file. When the file is opened and read, the access behavior is used to allocate a relatively large cache or a relatively small cache based on the access behavior. The access behavior indicator can be modified dynamically as access behavior changes. Accordingly, other uses and modifications of the present invention will be apparent to persons of ordinary skill without departing from the spirit and scope of the present invention. All of such uses and modifications are intended to fall within the spirit and scope of the appended claims.

I claim:

1. A method, performed by a computer having a cache, for caching data from a file stored on disk, the method comprising the steps of;
   monitoring, upon opening the file, file access behavior in reading data from the file;
   maintaining, upon closing the file, access information corresponding to the file indicating the file access behavior monitored;
   obtaining, upon reopening the file, the access information maintained; and
   reading an amount of the data from the file into the cache, the amount based on the access information obtained.

2. The method of claim 1 wherein the step of monitoring file access behavior comprises monitoring a total number of reads in which substantially adjacent sectors are read while reading data from the file.

3. The method of claim 1 wherein the stpe of monitoring file access behavior comprises monitoring a total amount of time lapsed while reading data from the file.

4. The method of claim 1 wherein the step of reading an amount of the data from the file comprises
   reading a first amount of data into the cache when a total number of reads in which substantially adjacent sectors are read, divided by a total number of reads while reading data from the file, exceeds a predetermined amount,
   reading a second amount of data into the cache when the total number of reads in which substantially adjacent sectors are read, divided by a total number of reads while reading data from the file, exceeds a predetermined amount and a total number of sectors read while reading data from the file divided by a total amount of time lapsed while reading data from the file exceeds a predetermined amount, and
   wherein the step of reading an amount of data comprises reading a second amount of data that is larger than the first amount of data when the total number of sectors read while reading data from the file divided by a total amount of time lapsed while reading data from the file exceeds a predetermined amount.

5. The method of claim 1 wherein the step of monitoring file access behavior comprises accumulating an amount of time lapsed and number of reads in which substantially adjacent sectors are read divided by a total number of reads during each access of the file.

6. The method of claim 5 wherein the step of maintaining access information comprises storing a flag in the file indicating whether a total of the accumulated number of reads in which substantially adjacent sectors are read divided by a total amount of reads during each access of the file, divided by a total amount of time lapsed while reading data from the file, exceeds a predetermined amount.

7. The method of claim 5 wherein the step of maintaining access information comprises storing a flag in the file indicating whether a total amount of time lapsed during each access of the file exceeds a predetermined amount.

8. A computer system for caching data, comprising:
   a storage medium storing a file;

a computer connected to the storage medium and having a cache, the computer comprising means for monitoring, upon opening the file, file access behavior in reading data from the file, means for storing, upon closing the file, in the file access information indicating the file access behavior monitored, and means for reading, upon reopening the file, an amount of the data from the file into the cache, the amount based on the access information stored in the file.

9. The computer system of claim 8 wherein the access information comprises a flag indicating whether a total number of reads in which substantially adjacent sectors are read, divided by a total number of reads while reading data from the file, exceeds a predetermined amount.

10. The computer system of claim 8 wherein the access information comprises a flag indicating whether the total number of sectors read from the file divided by a total amount of time lapsed while reading data from the file, exceeds a predetermined amount.

11. The computer system of claim 8 wherein the access information comprises a total number of reads in which substantially adjacent secotrs are read while reading data from the file divided by a total number of reads, and a total amount of time lapsed while reading data from the file, and wherein the means for reading an amount of the data from the file into the cache comprises means for reading a first amount of data into the cache when the total number of reads in which substantially adjacent sectors are read while reading data from the file, divided by a total number of reads, exceeds a predetermined amount, and means for reading a second amount of data into the cache when a total number of sectors read while reading data from the file, divided by a total amounnt of time lapsed while reading data from the file, exceeds a predetermined amount, the second amount larger than the first amount.

* * * * *